US010328983B2

(12) United States Patent
Fiedler et al.

(10) Patent No.: US 10,328,983 B2
(45) Date of Patent: Jun. 25, 2019

(54) CLOSURE SYSTEM FOR CONNECTING A FIRST ASSEMBLY TO A SECOND ASSEMBLY

(71) Applicant: Fidlock GmbH, Hannover (DE)

(72) Inventors: Joachim Fiedler, Hannover (DE); Breido Botkus, Hannover (DE)

(73) Assignee: Fidlock GmbH, Hannover (DE)

( * ) Notice: Subject to any disclaimer, the term of this patent is extended or adjusted under 35 U.S.C. 154(b) by 0 days.

(21) Appl. No.: 15/874,367

(22) Filed: Jan. 18, 2018

(65) Prior Publication Data
US 2018/0222544 A1 Aug. 9, 2018

(30) Foreign Application Priority Data

Feb. 7, 2017 (DE) .......................... 10 2017 201 917

(51) Int. Cl.
B62J 11/00 (2006.01)
H01F 7/02 (2006.01)
B62J 7/08 (2006.01)

(52) U.S. Cl.
CPC ................. *B62J 11/00* (2013.01); *B62J 7/08* (2013.01); *H01F 7/0263* (2013.01)

(58) Field of Classification Search
CPC .............................. B62J 11/00; A43C 11/165
USPC ....... 224/414, 428, 431, 436, 441, 451, 455, 224/459, 460, 545, 547, 567, 568, 926
See application file for complete search history.

(56) References Cited

U.S. PATENT DOCUMENTS

| | | | |
|---|---|---|---|
| 8,353,544 B2 | 1/2013 | Fiedler | |
| 8,368,494 B2 | 2/2013 | Fiedler | |
| 8,430,434 B2 | 4/2013 | Fiedler | |
| 8,464,403 B2 | 6/2013 | Fiedler | |
| 8,484,809 B2 | 7/2013 | Fiedler | |
| 8,800,117 B2 | 8/2014 | Fiedler | |
| 9,706,814 B2 * | 7/2017 | Converse | ............. A61F 5/0118 |
| 9,758,080 B2 | 9/2017 | Goldman | |
| 2004/0173719 A1 | 9/2004 | Mitchell | |
| 2010/0283269 A1 | 11/2010 | Fiedler | |
| 2010/0287741 A1 | 11/2010 | Fiedler | |
| 2011/0001025 A1 | 1/2011 | Fiedler | |

(Continued)

FOREIGN PATENT DOCUMENTS

| | | |
|---|---|---|
| CN | 2571651 Y | 9/2003 |
| DE | 29502746 U1 | 4/1995 |

(Continued)

*Primary Examiner* — Justin M Larson
(74) *Attorney, Agent, or Firm* — The Webb Law Firm

(57) ABSTRACT

A closure system for connecting a first assembly to a second assembly includes a first closure device which includes a first closure part, which is to be arranged on the first assembly and includes a first magnetic element and a second closure part, which is to be fastened to the second assembly and includes a second magnetic element. The first closure part and the second closure part can be attached to each other along a closing direction and are mechanically latched with each other in a closed position. A second closure device serves for releasably fastening the second closure part to the second assembly. The second closure device includes a traction element arranged on the second closure part and a tensioning device connected to the traction element, wherein the tensioning device can be actuated to tension the traction element for fastening the second closure part to the second assembly.

20 Claims, 7 Drawing Sheets

(56) References Cited

U.S. PATENT DOCUMENTS

| | | |
|---|---|---|
| 2011/0030174 A1 | 2/2011 | Fiedler |
| 2011/0042435 A1* | 2/2011 | Weng .................. B62J 11/00 |
| | | 224/414 |
| 2011/0131770 A1 | 6/2011 | Fiedler |
| 2011/0147424 A1* | 6/2011 | Brown ............... B60N 3/103 |
| | | 224/441 |
| 2011/0298227 A1 | 12/2011 | Fiedler |
| 2014/0308062 A1* | 10/2014 | Belozerova ........ F16M 11/041 |
| | | 403/14 |
| 2015/0089779 A1* | 4/2015 | Lawrence ............. B60R 9/10 |
| | | 24/68 BT |
| 2015/0135486 A1 | 5/2015 | Fiedler et al. |
| 2016/0073744 A1 | 3/2016 | Fiedler et al. |

FOREIGN PATENT DOCUMENTS

| | | |
|---|---|---|
| DE | 102007058188 A1 | 6/2009 |
| DE | 102016216422 A1 | 3/2018 |
| WO | 2008006354 A2 | 1/2008 |
| WO | 2008006356 A2 | 1/2008 |
| WO | 2008006357 A2 | 1/2008 |
| WO | 2009010049 A2 | 1/2009 |
| WO | 2009092368 A2 | 7/2009 |
| WO | 2009127196 A2 | 10/2009 |
| WO | 2010006594 A2 | 1/2010 |
| WO | 2012151320 A1 | 11/2012 |
| WO | 2014090926 A1 | 6/2014 |
| WO | 2014180512 A1 | 11/2014 |
| WO | 2015006616 A1 | 1/2015 |

* cited by examiner

CLOSURE SYSTEM FOR CONNECTING A FIRST ASSEMBLY TO A SECOND ASSEMBLY

CROSS-REFERENCE TO RELATED APPLICATION

This application claims priority to German Patent Application No. 10 2017 201 917.4 filed Feb. 7, 2017, the disclosure of which is hereby incorporated in its entirety by reference.

BACKGROUND OF THE INVENTION

Field of the Invention

This invention relates to a closure system for connecting a first assembly to a second assembly, in particular for connecting a container to a frame of a vehicle, e.g. of a bicycle.

Description of Related Art

Such closure system comprises a first closure device which includes a first closure part with a first magnetic element to be arranged on the first assembly and a second closure part with a second magnetic element to be arranged on the second assembly. The first closure part and the second closure part can be attached to each other along a closing direction and are mechanically latched with each other in a closed position. A second closure device serves for releasably fastening the second closure part to the second assembly.

Such closure system for example can serve for fastening a container in the form of a drinking bottle to the frame of a bicycle.

In a closure known from WO 2012/151320 A9, a clamping bracket is fastened to a frame and includes magnetic elements which for fastening a drinking bottle to the frame cooperate with a magnetically active ring of the drinking bottle.

It is also known to latchingly fasten containers in the form of drinking bottles to a frame of a vehicle, wherein in this connection it has also been considered to use magnetic elements for securing the connection.

In general, a closure system by means of which a container (for example a drinking bottle) can be fixed to the frame of a vehicle (in particular of a two-wheeler or a three-wheeler) should be easy to operate. It should be possible to accommodate the container at the vehicle in a space-saving way, wherein for example in a frame opening of a bicycle frame only a limited space is available. In the open position, the closure system should have a small installation space both at the vehicle and at the container, so that the closure parts of the closure system do not disturb. It is also desirable to configure the closure system at low cost, wherein it should also be considered in particular that e.g. containers in the form of drinking bottles must be exchanged after a limited period of use.

SUMMARY OF THE INVENTION

It is an object of the present invention to provide a closure system which is easy to handle, provides for reliably fastening two assemblies to each other, and also is versatile and flexible to use.

This object is solved by a closure system with features as described herein.

Accordingly, the second closure device includes a traction element arranged on the second closure part and a tensioning device connected to the traction element. The tensioning device can be actuated in order to tension the traction element for fastening the second closure part to the second assembly.

The closure system includes two closure devices. A first closure device serves for releasably connecting a first closure part associated with the first assembly to a second closure part associated with the second assembly. By attaching the closure parts to each other the second assembly can be connected to the first assembly, and by releasing the closure parts from each other the second assembly can again be separated from the first assembly. The second closure device serves to fasten the second closure part of the first closure device to the second assembly, wherein this second closure device also is releasable and thus the connection of the second closure part with the second assembly can be separated.

Due to the fact that the attachment of the second closure part to the second assembly is releasable, the first closure device can flexibly be combined with entirely different assemblies in order to connect assemblies to each other. The second assembly for example can be realized by a container, for example a beverage bottle or the like, which via the second closure device can be fixed to the second closure part. The first assembly on the other hand can be realized for example by a vehicle, for example a bicycle in the form of a two-wheeler or a three-wheeler, so that via the closure system the container can be fastened to the bicycle, but can also be removed again from the bicycle.

The second closure device provides for fastening the second assembly to the second closure part via a tensible traction element. The traction element for example can be formed by a pliable element for transmitting tensile forces, for example in the form of a rope, belt or strap made of a flexible material. The traction element can be tensioned and for example can be put around a body of the second assembly, so that by tensioning the traction element the second assembly can be connected to the second closure part.

The traction element for example can have two ends connected to a body of the second closure part of the first closure device. The traction element, together with the tensioning device, for example can form a loop which can be put around the body of the second assembly. By tensioning the traction element a firm connection thus can be produced between the second assembly and the second closure part.

The tensioning device can be configured in an entirely different way and serves to tension the traction element, i.e. to vary the freely extended length of the traction element. In one aspect, the tensioning device includes a housing element and a tensioning element rotatable about an axis of rotation relative to the housing element. The tensioning element is operatively connected to the traction element such that by rotating the tensioning element relative to the housing element tensioning of the traction element is effected.

In one aspect, the tensioning element for example can include a winding element onto which the traction element can be wound by rotating the tensioning element. The winding element for example can be realized by a shank or a drum and for example can carry a circumferential groove onto which the traction element can be wound in a defined way.

It is conceivable here that merely one end of the traction element is connected to the winding element, and thus merely the one end of the traction element is wound onto the winding element by rotating the tensioning element. It is also conceivable, however, that two ends of the traction element are connected to the winding element, and when rotating the winding elements both ends thus are wound onto the winding element. Finally, it is also conceivable that the winding element is operatively connected to an internal portion of the traction element located between the ends of the traction element, and by rotating the winding element this internal portion is wound onto the winding element.

By rotating the winding element, the traction element is tensioned. It is to be ensured here that after being rotated, the winding element remains in an assumed position and thus the second closure part can reliably be fixed to the second assembly. For this purpose, the tensioning element for example can include a first freewheeling device which cooperates with a second freewheeling device of the housing element such that the tensioning element is rotatable in a winding direction relative to the housing element in order to wind the traction element onto the winding element, but a rotation of the tensioning element with respect to the housing element against the winding direction is blocked. The tensioning element thus provides for simply tensioning the traction element in the manner of a freewheel, wherein after tensioning the tensioning element remains in its position assumed then, and thus the second closure part of the first closure device is fixed to the second assembly.

To separate the second assembly from the second closure part, the second closure device can be relaxed. For this purpose, the tension at the traction element can be eliminated or at least be reduced, so that the second assembly can be removed from the second closure part. To provide for a relaxation of the second closure device, the tensioning element for example can be movable to the housing element of the second closure device axially to the axis of rotation, so that by axial adjustment the first freewheeling device of the tensioning element and the second freewheeling device of the housing element get out of engagement and the tensioning element thus can be turned back against the winding direction.

For example, the tensioning element can be spring-biased with respect to the housing element in the direction of an engagement of the freewheeling devices. The axial adjustment of the tensioning element with respect to the housing element then is effected against the spring bias, so that after an actuation to relax the tensioning device, the tensioning element is set back automatically and the freewheeling devices thus again get in engagement with each other.

The closure parts of the first closure device can be attached to each other in the closing direction in order to close the first closure device and connect the closure parts to each other. Closing of the first closure device is magnetically supported by the magnetic elements of the closure parts, so that on attachment of the closure parts to each other the closure parts are magnetically pulled towards each other and thus get into their closed position.

In the closed position the closure parts are mechanically latched with each other, so that the closure parts are loadably and positively held against each other. For this purpose, one of the closure parts for example can include a blocking piece and the other one of the closure parts for example a locking element, which in the closed position engage into each other such that the second closure part is fixed to the first closure part against the closing direction.

While the blocking piece for example can be formed as a protruding closing pin, the locking element for example can be formed as a component elastically resilient transversely to the closing direction. On closing of the first closure device a latching protrusion of the blocking piece thus can run up onto a latching protrusion of the locking element and in this way elastically resiliently urge the locking element aside, until the blocking piece positively snaps into engagement with the locking element. In the closed position, the latching protrusions of the blocking piece and of the locking element then are in engagement with each other, so that the closure parts are positively held against each other.

In one aspect, the locking element can be ring-shaped for example, wherein the locking element for example is open at a point on the circumference due to an opening through which the blocking piece can be moved to open the first closure device. The locking element thus realizes a C-ring which in the closed position at least partly encloses the blocking piece and thereby positively holds the same. For opening, the blocking piece can be moved through the opening formed at a point on the circumference of the locking element, so that the blocking piece can be brought out of engagement with the locking element and thereby can be released from the locking element.

Opening of the first closure device to release the closure parts from each other can be effected in that the second closure part is moved to the first closure part in an opening direction which differs from the closing direction. Due to the movement in the opening direction, the latching between the closure parts can be eliminated, so that the closure parts can be released from each other and the container associated with the second closure part can thus be removed from the frame of the vehicle.

By the fact that the opening direction differs from the closing direction it is to be understood here that the opening direction points in a direction different from the closing direction and in particular neither is directed against the closing direction. The opening direction for example can lie in a plane extending transversely to the closing direction and can be realized e.g. by a direction of rotation directed around the closing direction.

Closing of the first closure device thus can be effected by attaching the closure parts to each other in the closing direction. Opening of the first closure device then is effected by rotating the closure parts relative to each other around the closing direction so as to eliminate the latching between the closure parts.

To ensure a simple, easy handling for opening the first closure device, one of the closure parts for example can include a trunnion which in the closed position engages into a rotary opening of the other closure part and rotatably mounts the closure parts on each other along the opening direction (directed around the closing direction). For opening, the closure parts thus can be rotated relative to each other around the trunnion, so that the opening movement is guided. In particular, canting of the closure parts relative to each other on opening can be avoided in this way.

In a concrete aspect, the trunnion for example can be formed on the first closure part and protrude from a body of the first closure part along the closing direction. The rotary opening on the other hand can be formed for example at the second closure part.

In one aspect, the first closure part and the second closure part for example each can include two magnetic elements which are formed by permanent magnets. The magnetic elements of each closure part are spaced apart from each other transversely to the closing direction, wherein on closing the magnetic elements of the first closure part cooperate with the magnetic elements of the second closure part in a magnetically attracting way and thus magnetically support the closing of the first closure device.

The closure parts thus are automatically pulled towards each other during the attachment, so that in an advantageous aspect the closing of the first closure device can at least largely be effected automatically.

In an advantageous aspect, the magnetic elements of each closure part with opposite magnetic poles each point towards the respective other closure part. The two magnetic elements of the first closure part thus point towards the second closure part with different magnetic poles, namely a north pole and a south pole. The magnetic elements of the second closure parts likewise point towards the first closure part with opposite magnetic poles, namely a south pole and a north pole. This opposite polarization of the magnetic elements on each closure part ensures that the closure parts only can be attached to each other in exactly one position, which helps to avoid a wrong attachment of the closure parts to each other and a possibly incomplete connection of the closure parts to each other.

A container for use on a bicycle can be formed for example as a bottle, pocket or some other container. The container for example can realize a drinking bottle, a tool container or a container for a battery. The container can be formed in particular as a rigid structure (with a rigid body) or also as a flexible fabric (for example as a pocket with a flexibly deformable body).

A closure system as described above can be used e.g. on a bicycle, wherein such bicycle can be driven by human pedal force or also electrically. A closure system as described here, however, can be used to connect two entirely arbitrary assemblies to each other.

The second closure device with the traction element and the tensioning device for example can be configured as it is described in WO 2015/006616 A1.

The first closure device on the other hand can be realized in principle by entirely different magneto-mechanical closure devices. For example, the closure device can be configured as described in WO 2008/006357 A2, WO 2008/006354 A2, WO 2009/092368 A2, WO 2010/006594 A2, WO 2008/006356 A2, WO 2009/010049 A2, WO 2009/127196 A2, WO 2014/090926 A1 and in the International Application PCT/EP 2013/060762.

BRIEF DESCRIPTION OF THE DRAWINGS

The idea underlying the invention will be explained in detail below with reference to the exemplary embodiment illustrated in the Figures.

DESCRIPTION OF THE INVENTION

Figure 1:
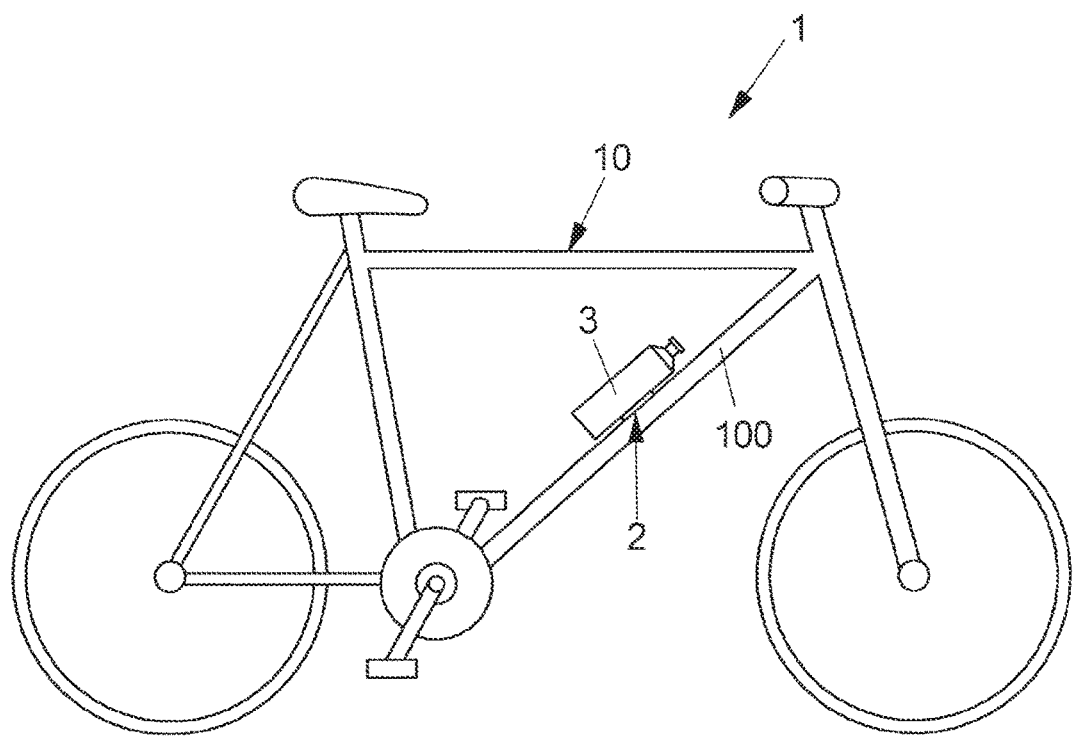
FIG. 1 shows a schematic view of a vehicle in the form of a bicycle.

FIG. 1 shows a schematic view of a vehicle 1 in the form of a bicycle which includes a frame 10 with a frame bar 100 to which a container 3 for example in the form of a drinking bottle or another container, e.g. a pocket, is attached via a closure system.

FIGS. 2 to 7 show an exemplary embodiment of a closure system with a first closure device 2 which serves for connecting a container 3 to the frame 10 of a vehicle 1. The closure device 2 includes a first closure part 4 which is to be firmly connected, for example screwed, to a frame bar 100 of the frame 10 of the vehicle 1. To the first closure part 4 a second closure part 5 can be attached, which is to be connected to the container 3 (but is releasable, as will yet be explained below). By attaching the container 3 with the second closure part 5 fastened thereto to the first closure part 4 arranged on the frame 10, the container 3 thus can be fixed to the frame 10 of the vehicle 1.

At this point it should be noted that a closure system as described here is not limited to the connection of a container 3 to a bicycle 1, but generally can be used to connect two assemblies to each other. The use for connecting a container 3 to a bicycle 1 in so far is to be understood only by way of example.

The first closure part 4 includes a body 40 from which two blocking pieces 41A, 41B protrude. The blocking pieces 41A, 41B each include a shank 411 at whose end remote from the body 40 a latching protrusion 410 is formed, which extends around the shank 411 and radially protrudes from the shank 411 to the outside.

On the side facing away from the blocking pieces 41A, 41B the body 40 includes receiving openings 400A, 400B at the site of the blocking pieces 41A, 41B, into which magnetic elements 43A, 43B are inserted and firmly connected to the body 40.

The second closure part 5 has a body 50 in which two closure openings 500A, 500B are formed, in each of which a locking element 51A, 51B is received via a fastening plate 52A, 52B. The locking elements 51A, 51B are received in fastening grooves 520 of the fastening plates 52A, 52B and fastened therein and enclose magnet receptacles 521 formed as raised portions, in each of which a magnetic element 53A, 53B is arranged.

The locking elements 51A, 51B are ring-shaped, but are circumferentially open via one opening 511 each, so that the locking elements 51A, 51B represent C-rings. Each locking element 51A, 51B is fixed to the associated fastening plate 52A, 52B such that the locking element 51A, 51B is elastically resilient and in particular can be spread radially in order to provide for an engagement of the blocking pieces 41A, 41B of the first closure part 4 into the locking elements 51A, 51B of the second closure part 5.

Each locking element 51A, 51B includes an internal circumferential (possibly sectionally interrupted) latching protrusion 510 which protrudes from a ring body 512 of the locking element 51A, 51B radially to the inside. In the closed position of the closure device 2 the latching protrusions 510 of the locking elements 51A, 51B latchingly are in engagement with the latching protrusions 410 of the blocking pieces 41A, 41B of the first closure part 4, so that the closure parts 4, 5 are positively held against each other.

Figure 4:
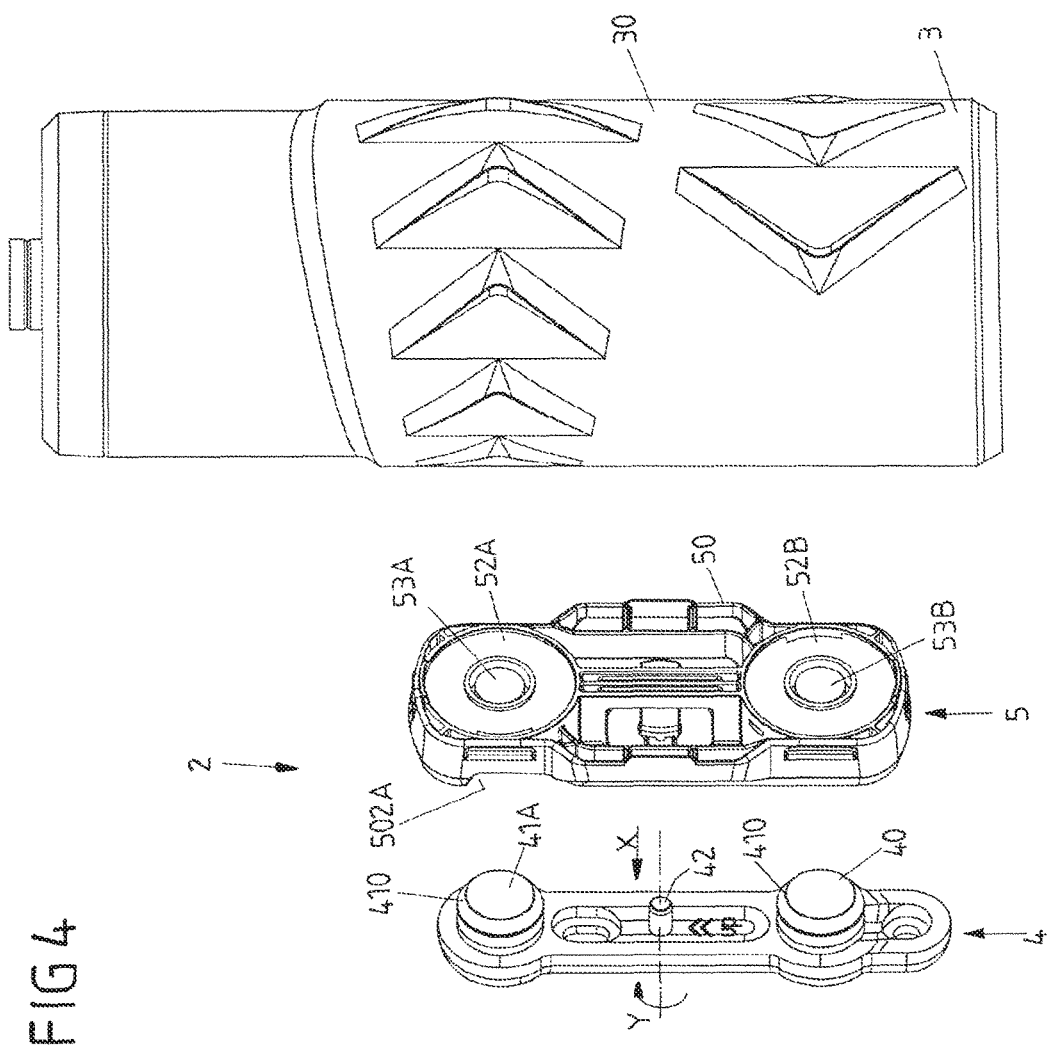
FIG. 4 shows a view of the closure parts of a first closure device of the closure system.

In the mounted position, the locking elements 51A, 51B, held via the fastening plates 51A, 52B, rest in the closure openings 500A, 500B of the body 50 of the second closure part 5. For closing the closure device 2 the second closure part 5 can be attached to the first closure part 4 in a closing direction X, as shown in FIG. 4, whereby the blocking pieces 41A, 41B of the first closure part 4 dip into the closure openings 500A, 500B and hence into the locking elements 51A, 51B of the second closure part 5 and in doing so expand the locking elements 51A, 51B by the latching protrusions 410, 510 running up onto each other, until the blocking pieces 41A, 41B positively snap into engagement with the locking elements 51A, 51B, and the second closure part 5 thereby is fixed to the first closure part 4.

The magnetic elements 43A, 43B, 53A, 53B, which oppose each other in a magnetically attracting way, magnetically support the closing operation, so that closing of the closure device 2 can largely be effected automatically by approaching the second closure part 5 to the first closure part 4.

While the closing of the closure device 2 is effected by attaching the second closure part 5 to the first closure part 4 in the closing direction X, the closure device 2 can again be opened by rotating the second closure part 5 connected to the container 3 relative to the first closure part 4 in an opening direction Y (FIG. 4) directed around the closing direction X. When rotating the second closure part 5 in the opening direction Y relative to the first closure part 4, the blocking pieces 41A, 41B are moved through the openings 511 of the locking elements 51A, 51B and get out of the region of the closure openings 500A, 500B through side openings 502A, 502B laterally opening the closure openings 500A, 500B. The positive engagement between the closure parts 4, 5 thus is eliminated, so that the second closure part 5 can be removed from the first closure part 4.

When attaching the closure parts 4, 5 to each other, a trunnion 42 which protrudes from the body 40 of the first closure part 4 (see FIG. 4) gets in engagement with a rotary opening 501 at the body 50 of the second closure part 5 (see FIG. 2), via which the second closure part 5 is rotatably mounted on the first closure part 4 in the opening direction Y. In this way, the opening movement of the second closure part 5 relative to the first closure part 4 is guided, which simplifies handling and in particular avoids a canting of the closure parts 4, 5 on opening.

Figure 3:
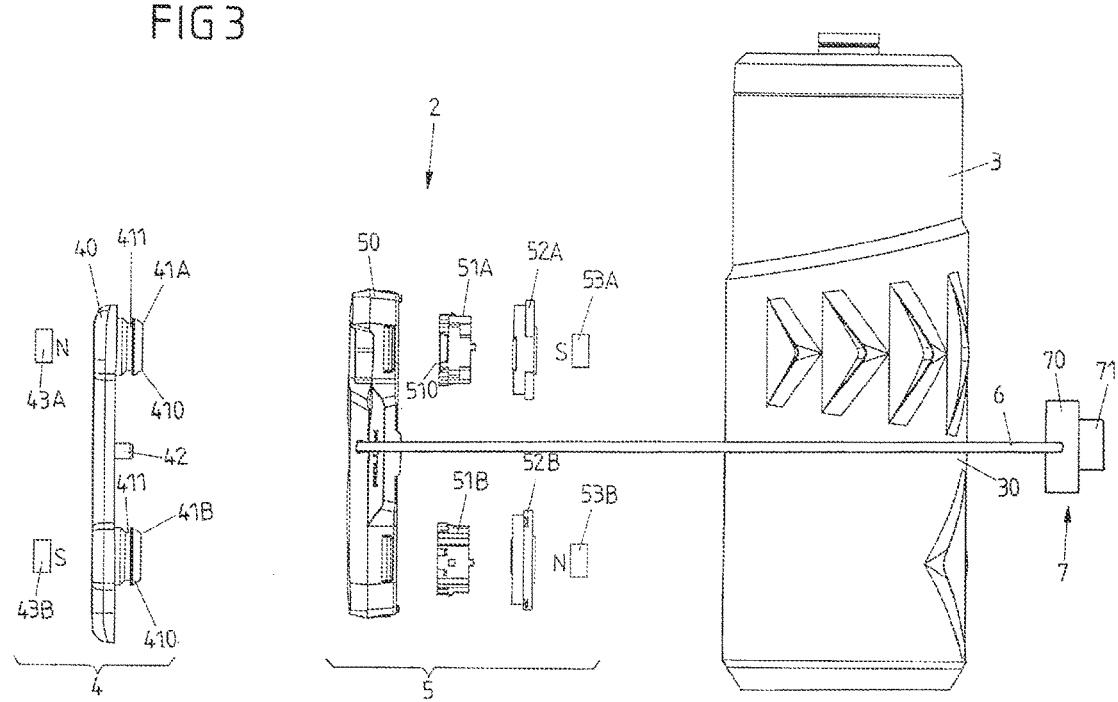
FIG. 3 shows a side view of the closure system.

As shown in FIG. 3, the magnetic elements 43A, 43B, 53A, 53B of each closure part 4, 5 point to the respective other closure part 5, 4 with different poles N, S. The magnetic elements 43A, 43B of the first closure part 4 point to the second closure part 5 with a north pole N (magnetic element 43A) on the one hand and with a south pole S (magnetic element 43B) on the other hand. Conversely, the magnetic elements 53A, 53B of the second closure part 5 point to the first closure part 4 with a south pole S (magnetic element 43A) on the one hand and with a north pole N (magnetic element 53B) on the other hand. By this opposite polarization it is achieved that the closure parts 4, 5 only can be attached to each other in exactly one position, whereby it is ensured that the closing of the closure device can reliably be effected when the blocking pieces 41A, 41B are completely latched with the locking elements 51A, 51B.

On opening of the closure device 2, the magnetic elements 53A, 53B of the second closure part 5 also are moved relative to the magnetic elements 43A, 43B of the first closure part 4, so that the magnetic attraction between the magnetic elements 43A, 43B, 53A, 53B is attenuated and the closure parts 4, 5 thus can easily be removed from each other.

Figure 2:
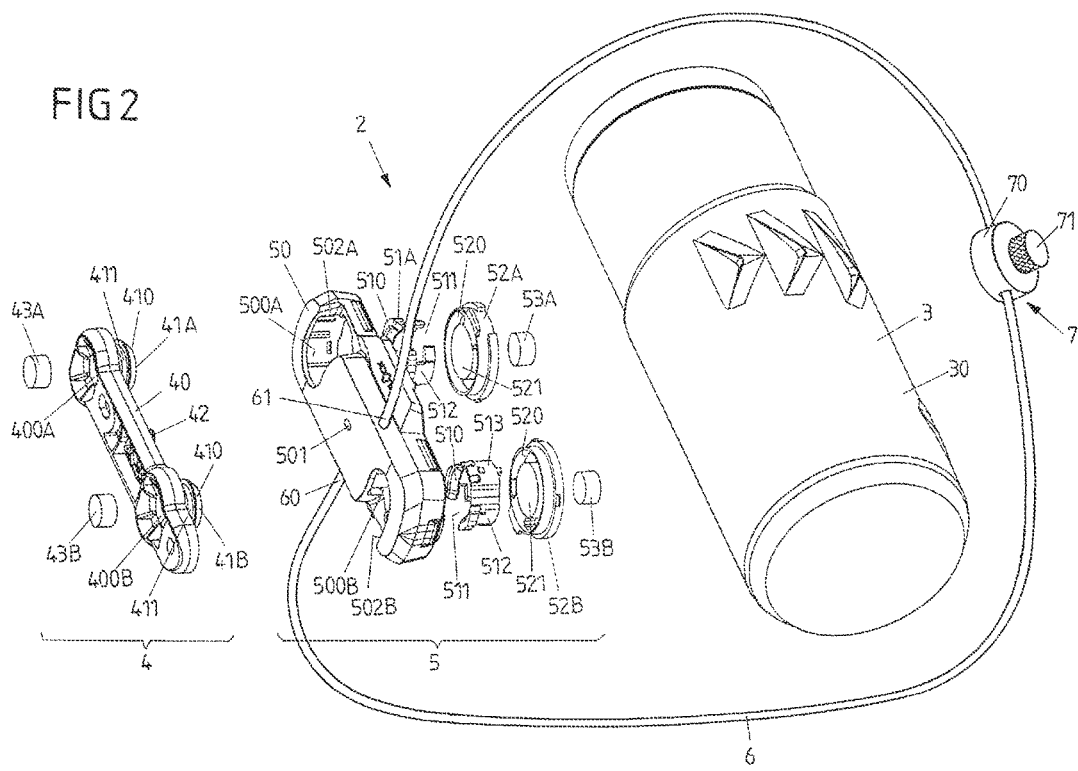
FIG. 2 shows a view of an exemplary embodiment of a closure system with two closure devices.
Figure 7:
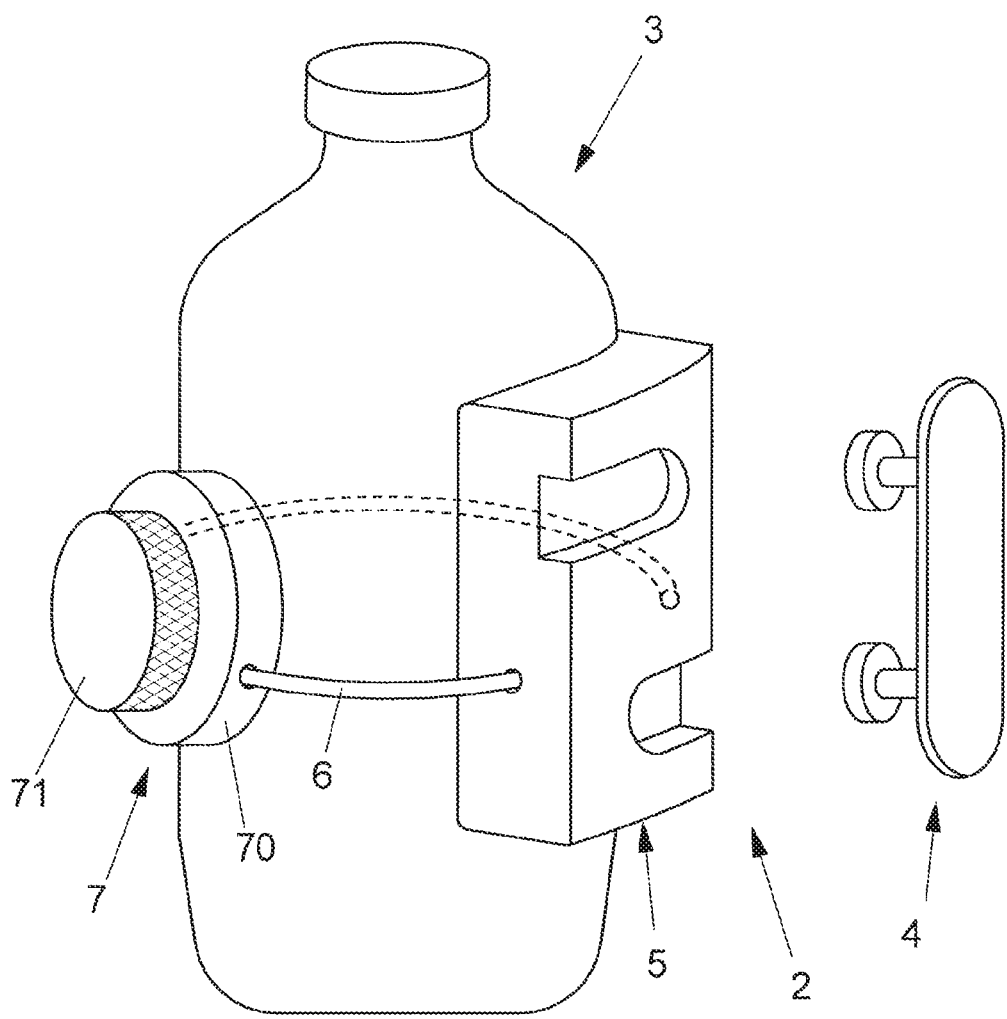
FIG. 7 shows a schematic view of the closure system on a container in the form of a beverage bottle.

The second closure part 5 of the closure device 2 is fixed to the container 3, for example to a drinking bottle, so that with the second closure part 5 the container 3 can be fastened to the first closure part 4 and hence to the frame 10 of the vehicle 1. The attachment of the second closure part 5 to the container 3 here is effected via a second closure device which includes a traction element 6 and a tensioning device 7. The traction element 6 is connected to the second closure part 5 with ends 60, 61 and thereby forms a loop, as shown in FIG. 2, which can be put around the body 30 of the container 3, so that by tensioning the traction element 6, as shown in FIG. 7, the container 3 can be firmly connected to the second closure part 5 of the closure device 2.

The traction element 6 is formed as pliable element and serves to transmit (exclusively) tensile forces. By means of the tensioning device 7 the freely extended length of the traction element 6 can be varied, so that by shortening the freely extended length the traction element 6 can be tensioned in order to connect the container 3 to the second closure part 5. The tensioning device 7 also can be actuated to relax the traction element 6, so that the second closure part 5 also can be released again from the second closure device realized by the traction element 6 and the tensioning device 7.

Figure 5:
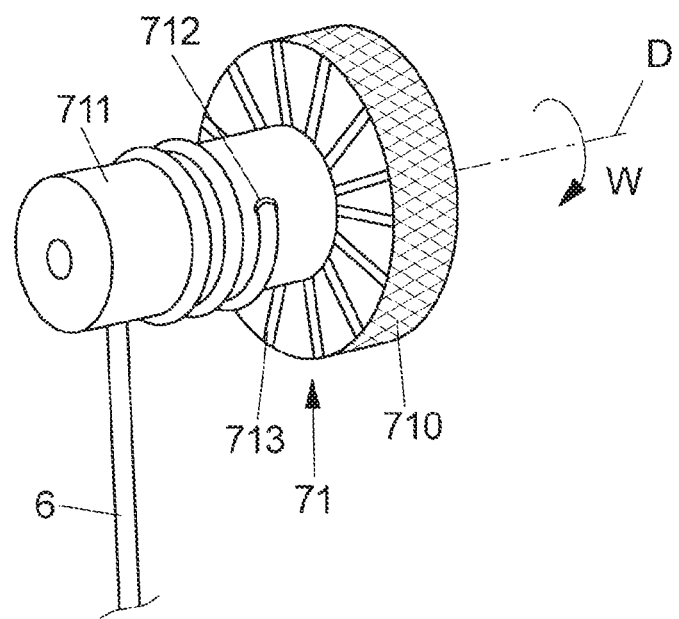
FIG. 5 shows a view of a tensioning element of a second closure device of the closure system.
Figure 6:
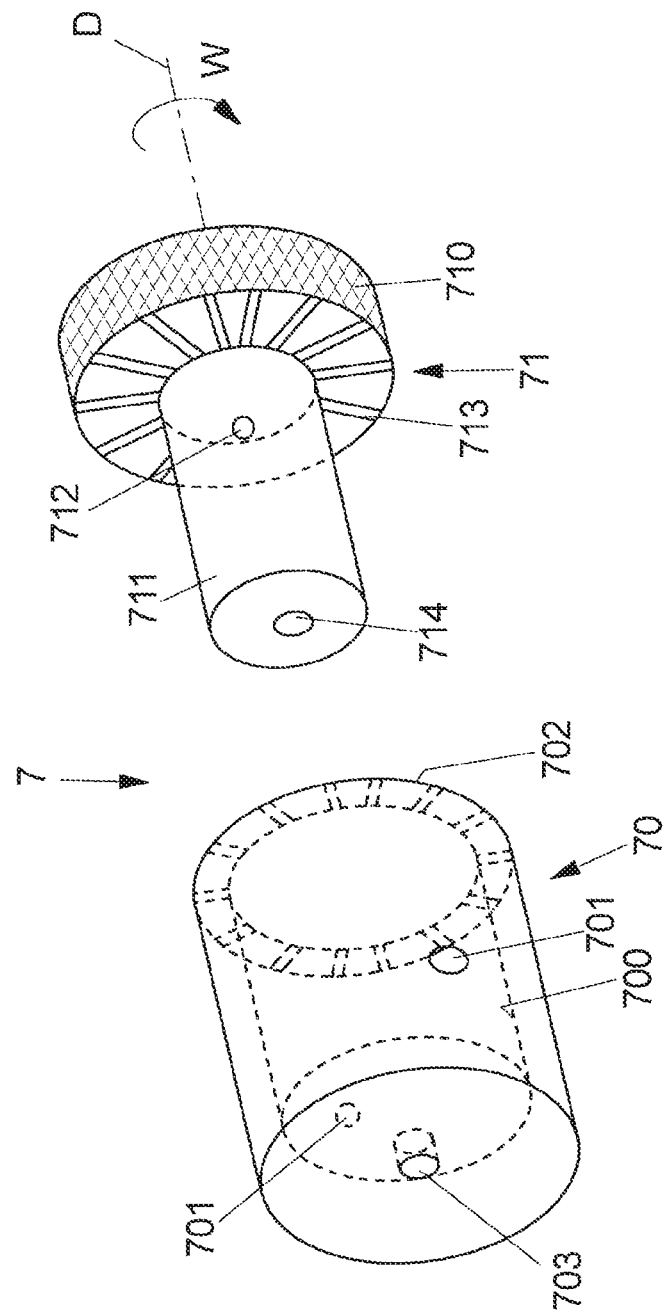
FIG. 6 shows a view of the tensioning element together with a housing element of the second closure device.

FIGS. 5 and 6 schematically show the basic mode of operation of the tensioning device 7. The tensioning device 7 includes a housing element 70 to which a tensioning element 71 is rotatable about an axis of rotation D. The tensioning element 71 includes a head 710 and a winding element 711 in the form of a shank or a drum element, which protrudes from the head 710 and engages into an opening 700 of the housing element 70. On the winding element 711 the traction element 6 is arranged, as shown in FIG. 5, so that by rotating the tensioning element 71 relative to the housing element 70 the traction element 6 can be wound onto the winding element 711 in order to tension the traction element 6.

On the winding element 711 a circumferential groove can be arranged, for example, which serves to receive the traction element 6. On winding of the traction element 6, the traction element 6 gets into the groove and thereby assumes a defined position on the winding element 711.

During tensioning, the housing element 70 remains (substantially) stationary. The traction element 6 extends through opposite openings 701 in the circumferential shell surface of the housing element 70 and also through an opening 712 at the winding element 711 of the tensioning element 71. By rotating the tensioning element 71 the traction element 6 thus is wound onto the winding element 711 (namely with both portions of the traction element 6 extending towards the tensioning device 7; in FIG. 5, merely a portion of the traction element 6 is shown for simplification).

In the schematic exemplary embodiment of the tensioning device 7 shown in FIGS. 5 and 6 an internal portion between the ends 60, 61 of the traction element 6 connected to the second closure part 2 is wound onto the winding element 711, and the traction element 6 thereby is tensioned. The internal portion extends through the opening 712 at the winding element 711 and is not necessarily firmly connected to the winding element 711.

Alternatively, it is also conceivable that the traction element 6 is firmly connected to the winding element 711 with two (separate) ends.

It is also conceivable that one end of the traction element 6 is firmly connected to the housing element 70 and merely the other end is arranged on the winding element 711. When rotating the winding element 711, merely one end of the traction element 6 thus is wound onto the winding element 711.

On a side axially facing the housing element 70 the head 710 of the tensioning element 71 includes a freewheeling device 713 which is associated with a freewheeling device 702 on the frontal surface of the housing element 70 axially facing the head. The freewheeling devices 702, 713 for example each are formed as a sawtooth-shaped serration and cooperate in order to provide for a smooth rotation of the tensioning element 71 in a winding direction W around the axis of rotation D with respect to the housing element 70, but to block a rotation back against the winding direction W. The freewheeling devices 702, 713 in this way realize a freewheel which provides for tensioning of the traction element 6 and after tensioning blocks the tensioning element 71 in a position assumed then.

To on the one hand provide for a ratcheting adjustment of the tensioning element 71 with respect to the housing element 70 for tensioning and on the other hand also provide for a relaxation, the tensioning element 71 preferably is axially movable (by a small distance) with respect to the housing element 70 along the axis of rotation D. For example, the tensioning element 71 can be pretensioned with respect to the housing element 70 via a suitable spring element axially in the direction of an engagement of the freewheeling devices 702, 713, wherein by an axial actuation of the tensioning element 71 the freewheeling devices 702, 713 can be brought of out engagement, so that the blockage of the tensioning element 71 is eliminated and the tensioning element 71 can be rotated back against the winding direction W in order to relax the traction element 6 and thus be able to release the second assembly in the form of the container 3 from the second closure part 5.

To fix the tensioning element 71 to the housing element 70 a fastening element for example can reach through an opening 703 at the bottom of the housing element 70 and engage into a fastening opening 714 at the winding element 711 of the tensioning element 71. The attachment here preferably is designed such that the tensioning element 71 axially is (slightly) movable relative to the housing element 70, wherein the tensioning element 71 preferably is spring-biased with respect to the housing element 70.

The second closure device with the traction element 6 and the tensioning device 7 for example can be configured as it is described in WO 2015/006616 A1.

When the second closure part 5 is attached to the first closure part 4, the container 3 thereby is also fixed to the frame 10. The container 3 can be formed as a drinking bottle, as a storage container for tools or other objects, e.g. for a battery. The container 3 also can be realized as a pocket or the like.

The closure device 2 can be used e.g. for connecting a container 3 to a frame 10 of a vehicle 1, in particular of a two-wheeler or a three-wheeler, wherein this should by no means be understood in a limiting sense. A closure system as described here can serve to connect two arbitrary assemblies to each other. Via the first closure device 2 the assemblies are connectable to each other. Via the second closure device the second closure part 5 of the first closure device 2 can releasably be connected to the second assembly, so that the closure system can flexibly be used with different assemblies and in particular the second assembly can also be exchanged.

The idea underlying the invention is not limited to the exemplary embodiments described above, but can also be realized in an entirely different way in entirely different embodiments.

LIST OF REFERENCE NUMERALS

1 first assembly (vehicle)
10 frame
100 frame bar
2 closure device
3 second assembly (container)
30 body
31 receiving depression
310 fastening surface
4 closure part
40 body
400A, 400B receiving opening
41A, 41B blocking piece
410 latching protrusion
411 shank
42 trunnion
43A, 43B magnetic element
5 closure part
50 body
500A, 500B closure opening
501 rotary opening
502A, 502B side opening
51A, 51B locking element
510 latching protrusion
511 opening
512 ring body
52A, 52B fastening plate
520 fastening groove
521 magnet receptacle
53A, 53B magnetic element
6 traction element
60, 61 ends
7 tensioning device
70 housing element
700 opening
701 opening
702 freewheeling device
703 fastening opening
71 tensioning element
710 head
711 winding element (shank)
712 opening
713 freewheeling device
714 fastening point
71 body
D axis of rotation
N north pole
S south pole
W winding direction
X closing direction
Y opening direction

The invention claimed is:

1. A closure system for connecting a first assembly to a second assembly, comprising
   a first closure device which includes a first closure part, which is be arranged on the first assembly and comprises a first magnetic element, and a second closure part, which is to be fastened to the second assembly and comprises a second magnetic element, wherein the first closure part and the second closure part can be attached to each other along a closing direction and are mechanically latched with each other in a closed position, and
   a second closure device for releasably fastening the second closure part to the second assembly,
   wherein the second closure device includes a traction element arranged on the second closure part and a tensioning device connected to the traction element, wherein the tensioning device can be actuated to tension the traction element for fastening the second closure part to the second assembly, and
   wherein the second closure part of the first closure device is releasable from the first closure part of the first closure device by moving the second closure part of the first closure device in an opening direction relative to the first closure part of the first closure device, the opening direction being directed transversely to the closing direction.

2. The closure system according to claim 1, wherein the traction element is formed by a pliable element configured to transmit tensile forces.

3. The closure system according to claim 1, wherein the traction element can be put around a body of the second assembly.

4. The closure system according to claim 1, wherein the traction element is connected to a body of the second closure part with two ends.

5. The closure system according to claim 1, wherein the tensioning device includes a housing element and a tensioning element rotatable about an axis of rotation relative to the housing element, wherein the tensioning element is operatively connected to the traction element and is rotatable relative to the housing element in order to tension the traction element.

6. The closure system according to claim 5, wherein the tensioning element includes a winding element onto which the traction element can be wound by rotating the tensioning element.

7. The closure system according to claim 6, wherein the tensioning element includes a first freewheeling device and the housing element includes a second freewheeling device, which cooperate such that the tensioning element is rotatable relative to the housing element in a winding direction in order to wind the traction element onto the winding element, but a rotation of the tensioning element against the winding direction is blocked.

8. The closure system according to claim 7, wherein the tensioning element is movable relative to the housing element axially to the axis of rotation in order to bring the first freewheeling device and the second freewheeling device out of engagement and thereby provide for a rotation of the tensioning element against the winding direction.

9. The closure system according to claim 1, wherein one of the closure parts of the first closure device includes at least one blocking piece and the other one of the closure parts includes at least one locking element, wherein in the closed position the at least one blocking piece engages into the locking element such that the second closure part is held at the first closure part against the closing direction.

10. The closure system according to claim 9, wherein the at least one locking element is formed elastically resilient transversely to the closing direction.

11. The closure system according to claim 9, wherein the at least one blocking piece includes a first latching protrusion and the at least one locking element includes a second latching protrusion, wherein in the closed position the first latching protrusion and the second latching protrusion positively engage into each other.

12. The closure system according to claim 9, wherein the at least one locking element annularly extends around the closing direction, wherein as seen along a circumferential direction around the closing direction the at least one locking element is opened by an opening through which the at least one blocking piece can be moved to open the first closure device.

13. The closure system according to claim 1, wherein the opening direction corresponds to a direction of rotation directed around the closing direction.

14. The closure system according to claim 1, wherein one of the closure parts of the first closure device includes a trunnion which in the closed position is in engagement with a rotary opening of the other closure part of the first closure device and rotatably mounts the closure parts on each other along the opening direction.

15. The closure system according to claim 1, wherein the first closure part of the first closure device includes two first magnetic elements spaced apart from each other transversely to the closing direction and the second closure part of the first closure device includes two second magnetic elements spaced apart from each other transversely to the closing direction.

16. The closure system according to claim 15, wherein the magnetic elements of each closure part point towards the other closure part with opposite magnetic poles.

17. A container for use on a bicycle, comprising the closure system according to claim 1.

18. The container according to claim 17, wherein the container is a beverage bottle, a tool container, or a container for a battery.

19. A bicycle, comprising the closure system according to claim 1 for fastening a container to a frame of the bicycle.

20. A closure system for connecting a first assembly to a second assembly, comprising
  a first closure device which includes a first closure part, which is be arranged on the first assembly and comprises a first magnetic element, and a second closure part, which is to be fastened to the second assembly and comprises a second magnetic element, wherein the first closure part and the second closure part can be attached to each other along a closing direction and are mechanically latched with each other in a closed position, and
  a second closure device for releasably fastening the second closure part to the second assembly,
  wherein the second closure device includes a traction element arranged on the second closure part and a tensioning device connected to the traction element, wherein the tensioning device can be actuated to tension the traction element for fastening the second closure part to the second assembly, and
  wherein one of the closure parts of the first closure device includes a trunnion which in the closed position is in engagement with a rotary opening of the other closure part of the first closure device and rotatably mounts the closure parts on each other along the opening direction.

* * * * *